(12) United States Patent
Dahlquist et al.

(10) Patent No.: US 8,727,257 B2
(45) Date of Patent: May 20, 2014

(54) SEAT BELT RETRACTOR FOR THE SAFETY BELT OF A MOTOR VEHICLE

(75) Inventors: Bengt Dahlquist, Dalsjöfors (SE); Erik Arthur Rydsmo, Sollebrunn (SE); Fredrik Wigström, Göteborg (SE)

(73) Assignee: Autoliv Development AB, Värgärda (SE)

( * ) Notice: Subject to any disclaimer, the term of this patent is extended or adjusted under 35 U.S.C. 154(b) by 189 days.

(21) Appl. No.: 13/375,519

(22) PCT Filed: May 28, 2010

(86) PCT No.: PCT/EP2010/003268
§ 371 (c)(1),
(2), (4) Date: Dec. 1, 2011

(87) PCT Pub. No.: WO2010/139434
PCT Pub. Date: Dec. 9, 2010

(65) Prior Publication Data
US 2012/0074253 A1    Mar. 29, 2012

(30) Foreign Application Priority Data
Jun. 5, 2009   (DE) .................. 10 2009 024 292

(51) Int. Cl.
*B65H 75/48* (2006.01)
(52) U.S. Cl.
USPC .................. 242/379.1; 280/806; 297/478
(58) Field of Classification Search
CPC ............... B60R 22/28; B60R 22/4676; B60R 2022/286; B60R 2022/287; B60R 2022/288
USPC .................. 242/379.1; 280/806; 297/478
See application file for complete search history.

(56) References Cited

U.S. PATENT DOCUMENTS

| 5,820,058 | A  | * | 10/1998 | Hirzel et al. ............... 242/379.1 |
| 6,012,667 | A  | * | 1/2000  | Clancy et al. ............. 242/379.1 |
| 6,241,172 | B1 | * | 6/2001  | Fugel et al. .............. 242/379.1 |
| 6,616,081 | B1 | * | 9/2003  | Clute et al. ............... 242/379.1 |
| 7,669,794 | B2 | * | 3/2010  | Boelstler et al. ........... 242/379.1 |
| 8,220,735 | B2 | * | 7/2012  | Wang et al. ............... 242/374 |
| 2007/0075173 | A1 |   | 4/2007  | Boelstler et al. |

FOREIGN PATENT DOCUMENTS

| DE | 103 07 430 B3 | 7/2004 |
| DE | 103 27 204 B4 | 6/2005 |
| EP | 1 674 354 A2 | 6/2006 |
| WO | WO 2006/022930 A2 | 3/2006 |
| WO | WO 2009/045132 A1 | 4/2009 |

OTHER PUBLICATIONS

German Search Report—Jan. 13, 2010.
PCT International Search Report—Sep. 10, 2010.

* cited by examiner

*Primary Examiner* — Sang Kim
(74) *Attorney, Agent, or Firm* — Brinks Gilson & Lione

(57) ABSTRACT

A seat belt retractor for a safety belt of a motor vehicle having a belt shaft (1) rotatably mounted in a frame, a profile head (2) lockable in relation to the frame, a load limiting device (20) located between the profile head (2) and the belt shaft (1) for enabling the belt shaft (1) to undergo a load limited rotation in the belt webbing extraction direction (A) with the profile head (2) being locked and a load limiting level predetermined by the load limiting device (20) being exceeded.

9 Claims, 4 Drawing Sheets

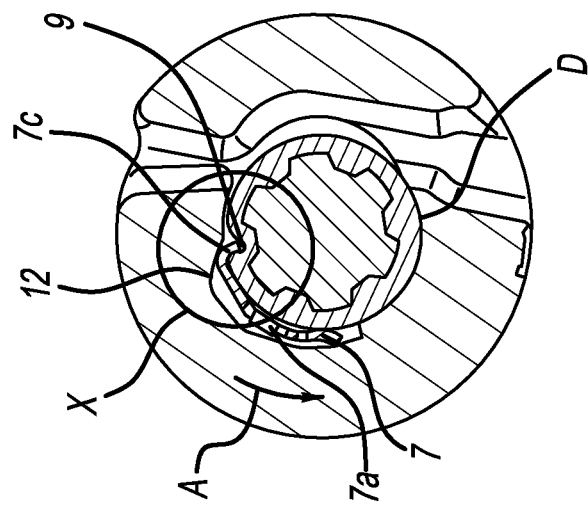
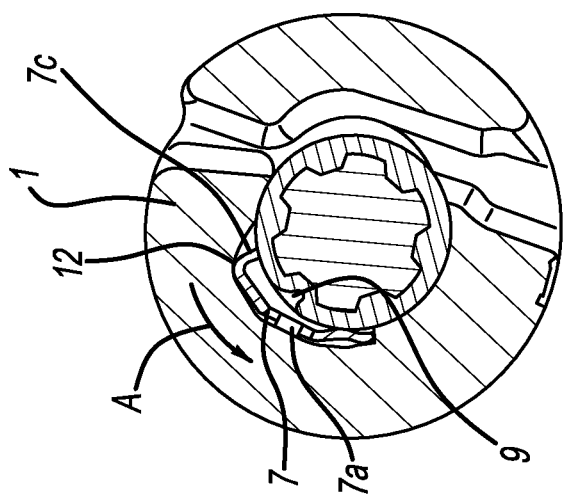
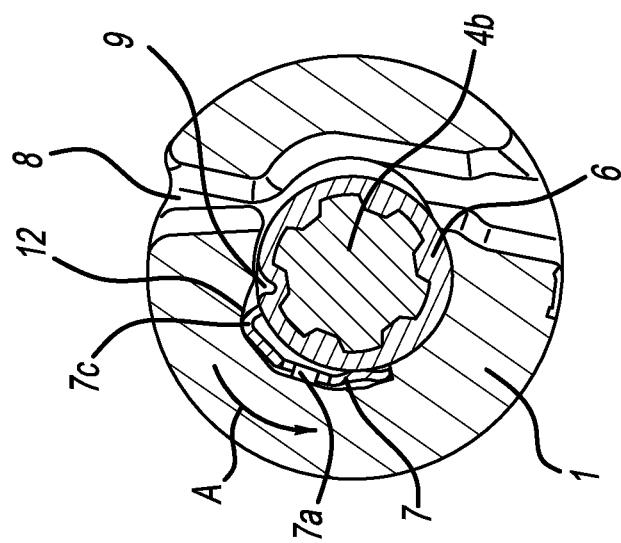

SEAT BELT RETRACTOR FOR THE SAFETY BELT OF A MOTOR VEHICLE

CROSS REFERENCE TO RELATED APPLICATIONS

This application claims priority to German Application No. 10 2009 024292.9, filed Jun. 5, 2009 and PCT/EP2010/003268, filed May 28, 2010.

FIELD OF THE INVENTION

The invention relates to a seat belt retractor for a safety belt of a motor vehicle.

BACKGROUND OF THE INVENTION

Generic seat belt retractors are used for example in motor vehicles for the safety belts of the rear seats. There is the general problem about rear seats that the distance available for the forward displacement of children or smaller adults, as for example the $5^{th}$ percentile-sized woman in a frontal collision, shall be utilized to the maximum, whereas for the heavy passenger the same safety belt must prevent a maximum belt webbing extraction length from being exceeded in a collision. Therefore, the load limiting device of such a seat belt retractor generally comprises two load limiting elements, by the time-shifted activation of which the load limiting level can be switched from a lower load limiting level to a higher load limiting level. Such a load limiting characteristic is also referred to as progressive load limiting.

From DE 103 27 204 B4 for example a seat belt retractor is known, in which a torsion rod is located between the profile head and the belt shaft, which torsion rod, during the load limited belt webbing extraction, is twisted around its own axis in an energy absorbing manner at the same time being subjected to plastic deformation. Furthermore, a metal band acting parallel to the torsion rod is provided, which metal band with one end is firmly hinged at a threaded bushing and in its course is pulled through a baffle fixed on the profile head. The threaded bushing being fixed at the beginning of the load limiting operation engages with an outer thread into an inner thread on the belt shaft. During the load limiting operation, at first, the torsion rod is twisted at the same time being subjected to plastic deformation, wherein the belt shaft rotates in relation to the threaded bushing. In doing so, the threaded bushing is pulled to the dead stop position so that the metal band firmly connected to the threaded bushing with one end is subsequently pulled through the baffle. The deformation energy or work resulting from the metal band being pulled through the baffle adds to the load limiting level effectuated by the torsion of the torsion rod so that the load limiting level is thereby switched from a lower to a higher load limiting level. However, it is a disadvantage of the proposed seat belt retractor that the progressive load limiting characteristic is achieved by the load limiting elements being activated simultaneously, and that the load limiting elements do not work independent of each other. Furthermore, the beginning of the high load limiting level depends on the time when the threaded bushing is pulled to the dead stop position. The time when the threaded bushing is pulled to the dead stop position depends on the distance between the threaded bushing and the belt shaft and on the pitch of the thread. As the available installation space is highly limited, it is desirable to use a thread having a pitch as small as possible resulting in the disadvantage that even minor deviations of the distance lead to substantial deviations of the rotation angle, at which the load limiting level is switched, from the predetermined rotation angle.

It is the object of the invention to provide a seat belt retractor comprising a load limiting device with a progressive load limiting characteristic, in which seat belt retractor it shall be possible to dimension the load limiting levels independent of each other and to determine the time of switching in relation to the load limited belt webbing extraction movement with a precision as high as possible.

SUMMARY OF THE INVENTION

The object is solved according to the invention by a seat belt retractor comprising the features of the claims. Preferred developments of the invention can be learned from the sub claims, the figures and the related description.

The basic idea of the invention is that
a first load limiting element with a higher load limiting level is provided, which load limiting element with a first end is connected to the profile head, and
that a second load limiting element with a lower load limiting level is provided, which load limiting element with a second end is connected to the belt shaft, and
that the second end of the load limiting element with the higher load limiting level is connected to the first end of the load limiting element with the lower load limiting level via a connecting element, and
that a coupling element is provided for coupling the connecting element to the belt shaft, via which coupling element the connecting element can be coupled to the belt shaft after the same has undergone a rotation of a predetermined angle.

A first essential advantage provided by the invention is that two load limiting elements acting independently during each phase of the load limiting are provided. By choosing independently acting load limiting elements, each load limiting level can be individually determined by individually designing each load limiting element. Moreover, a modular system is provided, in which the same seat belt retractor by the load limiting elements being interchanged can even have a different load limiting characteristic depending on the requirements of the vehicle manufacturer or on the individual use of the seat belt retractor, without the need for modifying other components. Furthermore, the load limiting level is switched by coupling the connecting element connected to the load limiting elements to the belt shaft. As the connecting element is connected to the load limiting elements, the same undergoes a relative movement in relation to the belt shaft during the load limited belt webbing extraction movement, which relative movement is identical or at least proportional to the belt webbing extraction movement. The relative movement used for switching the load limiting level thus directly results from the load limited belt webbing extraction movement so that the time of switching can be determined with a high precision in relation to the load limited belt webbing extraction movement, without the same being able to vary owing to other influences. The switching process itself is effectuated by the connecting element being coupled to the belt shaft, wherein the load limiting element with the lower load limiting level is bridged after the coupling.

BRIEF DESCRIPTION OF THE DRAWINGS

In the following, the invention is described in more detail on the basis of a preferred embodiment. The figures show in detail:

FIG. 3 is a cross-sectional view of the seat belt retractor in accordance with the present invention taken along line Z-Z from FIG. 2 prior to the start of the load limited belt webbing extraction movement;

FIG. 4 is a cross-sectional view of a seat belt retractor in accordance with the present invention taken along line Z-Z from FIG. 2 during the load limited belt webbing extraction movement with a low load limiting level;

FIG. 5 is a cross-sectional view of a seat belt retractor in accordance with the present invention taken along line Z-Z from FIG. 2 during the load limited belt webbing extraction movement with a high load limiting level.

DETAILED DESCRIPTION OF THE INVENTION

Figure 1:
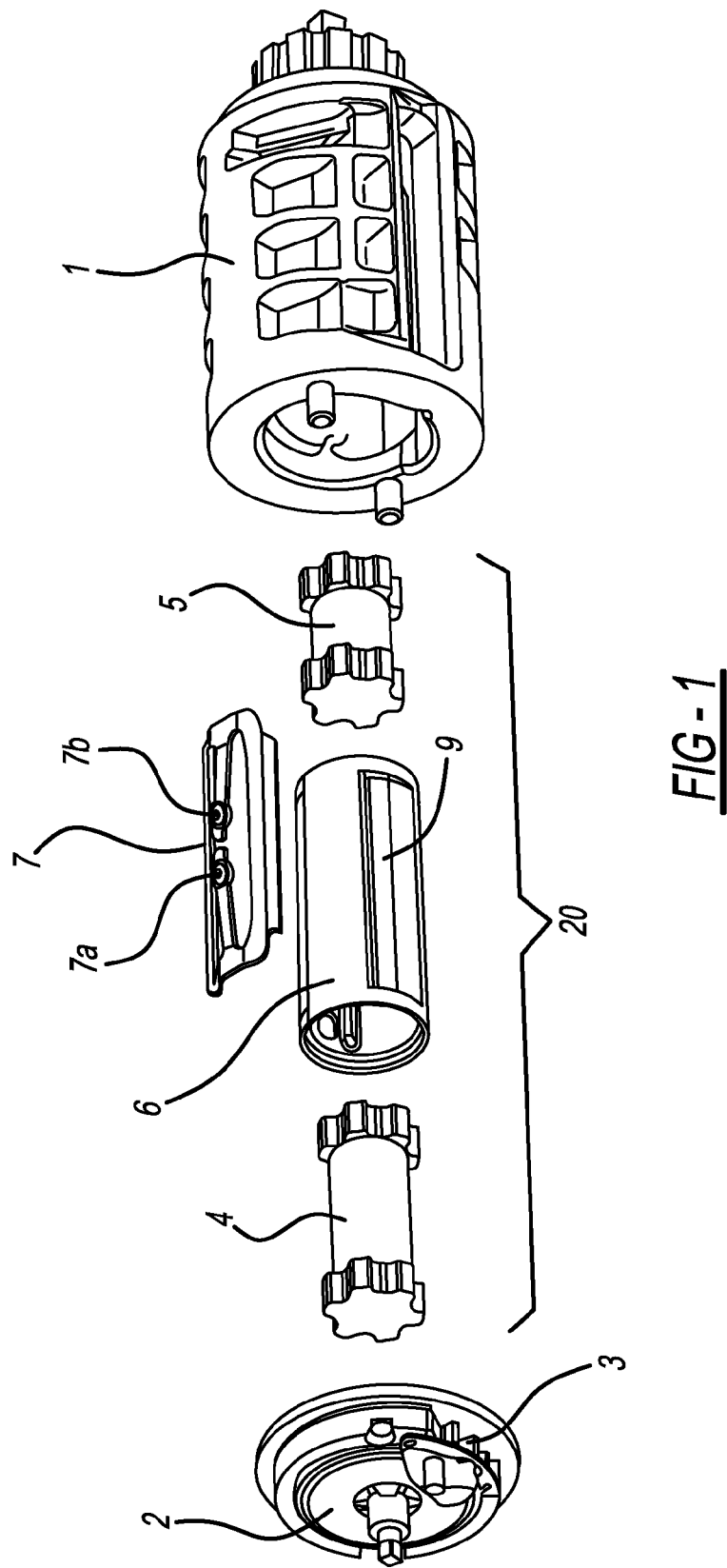
FIG. 1 in an exploded view of a seat belt retractor in accordance with the invention comprising a load limiting device with two load limiting elements.

FIG. 1 shows a seat belt retractor according to the invention comprising a belt shaft 1, a profile head 2 and a load limiting device 20 located between the belt shaft 1 and the profile head 2. The belt shaft 1 is rotatably mounted in a vehicle-fixed frame (not shown), in which frame a toothing is provided, in which the profile head 2 can be locked via a locking pawl 3 mounted on the profile head 2. A safety belt (not shown) can be wound up onto the belt shaft 1, which safety belt serves for restraining the passenger in the motor vehicle. During an accident, at first, the profile head 2 is locked via the locking pawl 3. At a further increase of the belt force during the forward displacement of the passenger, the load limiting device 20 enables the belt shaft 1 to undergo a load limited rotation in the belt webbing extraction direction when a predetermined load limiting level is exceeded thereby limiting belt loads acting on the restrained passenger.

The load limiting device 20 is formed from a first and a second load limiting element 4 and 5, each being designed as a torsion rod having a different plastic deformation limit. Furthermore, a connecting element 6 in the form of a torsion sleeve and a coupling element 7 in the form of an elastic preformed spring element are provided.

Figure 2:
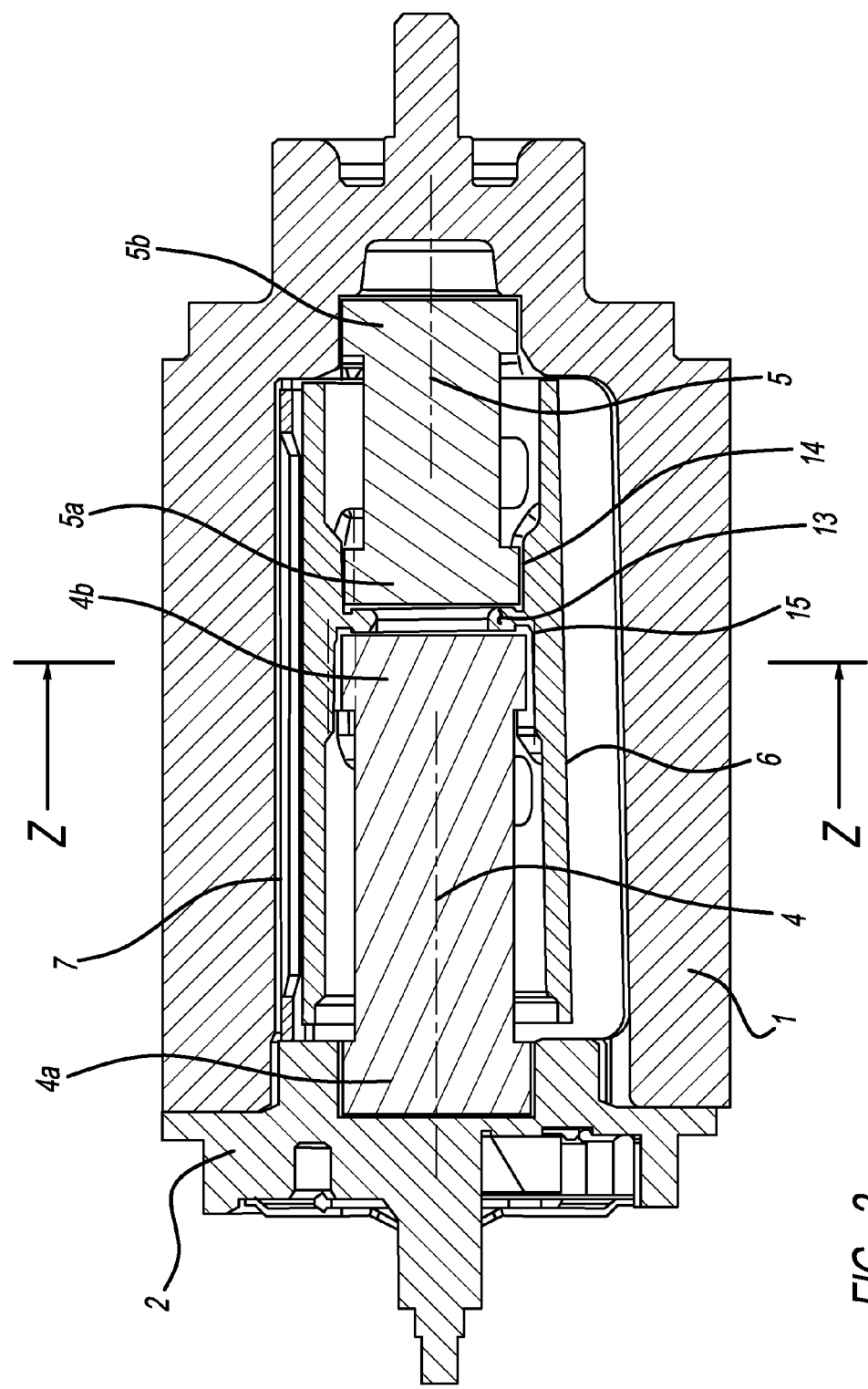
FIG. 2 is a longitudinal cross-sectional view of seat belt retractor in accordance with the present invention having a load limiting device with two load limiting elements.

FIG. 2 shows a sectional view of the same seat belt retractor in the assembled state. The load limiting elements 4 and 5 are inserted into the openings of the tubular connecting element 6 from the sides and are connected with the ends 4a and 5b protruding from the connecting element 6 to the belt shaft 1 and to the profile head 2. The connecting element 6 is provided with radially inward-directed profilings or projections 14 and 15, via which the load limiting elements 4 and 5 with the ends 4b and 5a are connected to the connecting element 6 in a rotationally fixed manner. A radially inward-projecting stiffening rib 13 is provided between the profilings 14 and 15, which stiffening rib, besides the stiffening function, at the same time serves as a block when the load limiting elements 4 and 5 are inserted. A coupling element 7 is located between the connecting element 6 and the belt shaft 1, which coupling element couples the connecting element 6 to the belt shaft 1 at a predetermined belt webbing extraction length during the load limiting. The mechanism will be described in detail later on.

At the beginning of the load limited belt webbing extraction movement, the connecting element 6 is not coupled to the belt shaft 1 and connects the ends 4b and 5a of the load limiting elements 4 and 5. As the end 4a of the load limiting element 4 with the high load limiting level is connected to the profile head 2, and as the connecting element 6 connects the ends 4b and 5a to each other, the end 5a of the load limiting element 5 with the profile head 2 being locked in a vehicle-fixed manner can also considered to be vehicle-fixed. In the event that the belt webbing extraction force exceeds the low load limiting level defined by the load limiting element 5, the belt shaft 1 with the load limiting element 5 being subjected to torsion starts to rotate in the belt webbing extraction direction. After the belt shaft 1 has undergone a rotation of a predetermined angle, the connecting element 6 is then coupled to the belt shaft 1 via the coupling element 7. By coupling the connecting element 6 to the belt shaft 1 the two ends 5a and 5b of the load limiting element 5 are connected to the belt shaft 1 so that now the load limiting element 5 is bridged and the end 4b is twisted in relation to the end 4a with the load limiting element 4 with the high load limiting level being provided by plastic torsional deflection.

FIGS. 3 to 5 show the seat belt retractor from FIG. 2 along the cross-section along line Z-Z at different times of the load limited belt webbing extraction. In FIG. 3, the belt webbing extraction force has just exceeded the low load limiting level determined by the load limiting element 5, and the belt shaft 1 starts to rotate in the belt webbing extraction direction A in relation to the ends 4b and 5a respectively, which ends are locked in a vehicle-fixed manner, and in relation to the fixed connecting element 6. The coupling element 7 is designed as a hook-shaped spring element and is received in a recess 12 in the belt shaft 1, and there abuts on the contact surface 12a. The contact surface 12a is formed to a bevel directed in the direction of the connecting element 6, see also FIG. 6. The coupling element 7 with one hooked portion 7c further abuts on the radial outer surface of the connecting element 6 and rests on the inner side of the belt shaft 1 via the spring arms 7a and 7b. On the radial outer surface of the connecting element 6 a groove 9 is provided extending essentially parallel to the longitudinal axis of the belt shaft 1 on the connecting element 6 and being located behind the hook 7c in the belt webbing extraction direction A at the beginning of the load limiting operation.

FIG. 4 shows the same arrangement at a later time shortly before switching the load limiting level. The groove 9 is located just in front of the hook 7c so that at a further rotation of the belt shaft 1 the switching process is about to happen. As the coupling element 7 goes around the connecting element 6 with the hook 7c constantly abutting, the coupling element 7 automatically engages into the groove 9 when reaching the same. Hereby, the movement of the coupling element 7 to the coupling position can be supported by the spring arms 7a and 7b resting on the belt shaft and/or by a spring pre-load of the coupling element 7 itself and/or by the shaping of the contact surface 12a upon a further relative rotation of the belt shaft 1 in relation to the connecting element 6. As the relative rotation of the connecting element 6 in relation to the rotational movement of the belt shaft 1 does not have a high or low gear transmission, the time of switching the load limiting level can be determined very precisely by the position of the groove 9.

In FIG. 5 the switching process has already been completed, i.e. the coupling element 7 with the hook 7c engages into the groove 9 and thereby couples the connecting element 6 to the belt shaft 1. The movement of the coupling element 7 to the position shown in FIG. 5 can be supported by the coupling element 7 being spring-loaded in the direction of the coupling position due to its shaping and material characteristics and/or by means of the spring arms 7a and 7b and thus automatically snapping into the groove 9 with the hook 7c when reaching the same. The unwound belt webbing length between the position of the belt shaft 1 prior to the start of the load limiting, for example in the position in FIG. 3, and the switching point where the hook 7c snaps into the groove 9 and thereby takes the coupling position, corresponds to the desired belt webbing extraction length, at which the low load limiting level is effective. Upon a further rotation of the belt shaft 1 from the position shown in FIG. 5, the high load limiting level is acting with the load limiting element 4 being subjected to plastic torsion.

However, in accordance with this invention, the switching process can be initiated earlier by choosing the position of the coupling element 7 in relation to the connecting element 6 in such a way that the coupling element 7 engages into the groove 9 at earlier reduced (or greater) angle of the relative rotational movement of the belt shaft 1 in relation to the connecting element 6. Thus, you could for example angles at intervals of 60 degrees could be provided, wherein by means of a corresponding mechanical coding of the position of the connecting element 6 in relation to the belt shaft 1 a modular system can be realized as well, in which different switching times can be realized by using the same parts.

Figure 6:
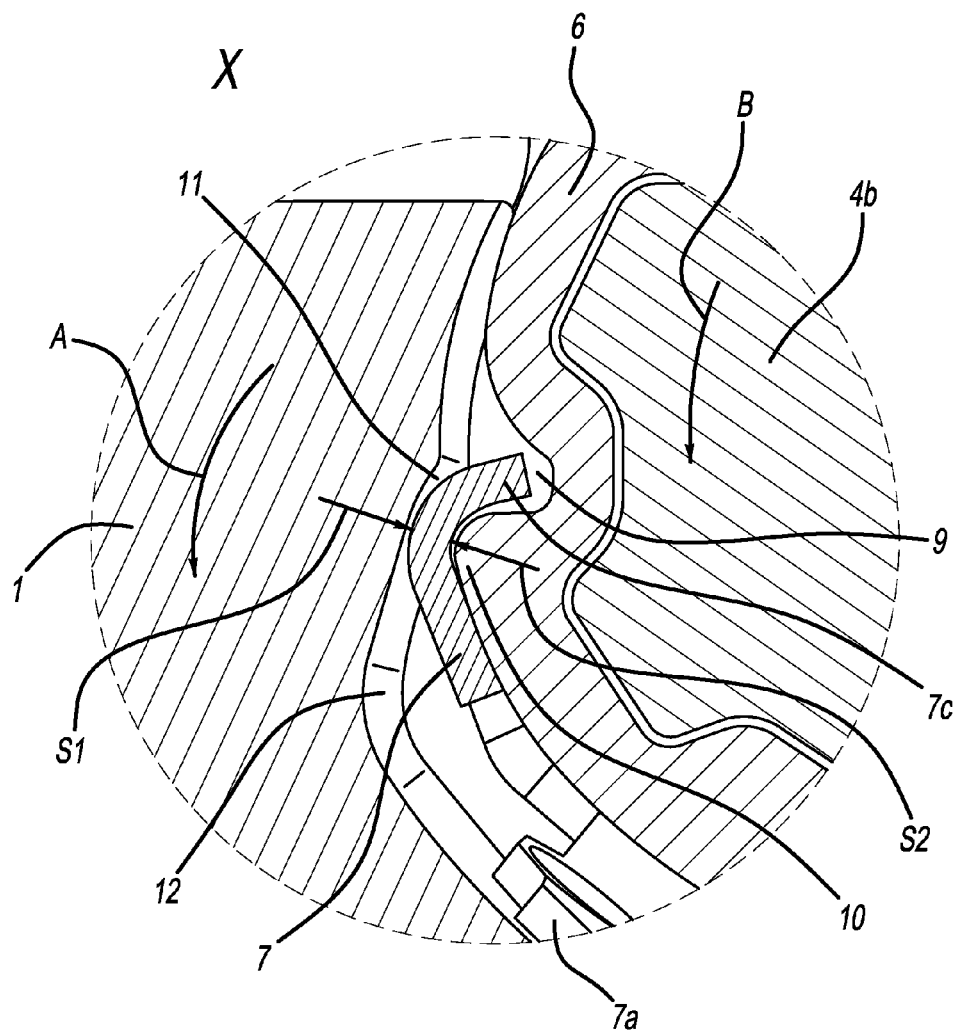
FIG. 6 is an enlarged representation of the cut-out X from FIG. 5.

FIG. 6 shows an enlarged representation of the cut-out X from FIG. 5. The coupling element 7 has been slightly displaced in the recess 12 in the circumferential direction during the switching process, wherein the coupling element 7 with the hook 7c now engages into the groove 9. During the displacement process the movement of the coupling element 7 to the position engaging into the groove 9 was supported by the same abutting on the contact surface 12a, wherein here the shaping of the contact surface 12a can be of important use for the control of the path of motion of the coupling element.

Upon a further rotation of the belt shaft 1 in the belt webbing extraction direction A the belt shaft 1 with a clamping surface 11 gets to abut on the coupling element 7, which however is supported in the circumferential direction by a projection 10 of the connecting element 6. Thereby, the coupling element 7 is clamped between the clamping surface 11 and the projection 10 exerting the clamping forces S1 and S2. Due to the coupling element 7 being clamped the rotational movement of the belt shaft 1 in the arrow direction A is transmitted in the arrow direction B onto the end 4b of the load limiting element 4 via the connecting element 6. Hereby, it is reasonable that, when a multitooth profile is used, the groove 9 engages between two teeth of the multitooth profile at the end 4b so that the circumferential forces are transmitted as directly as possible from the belt shaft 1 onto the end 4b of the load limiting element. As the groove 9 is aligned parallel to the longitudinal axis of the belt shaft 1, the clamping forces generated during the transmission of the rotational movement are transmitted as evenly and as efficiently as possible. Furthermore, besides the dimensioning of the involved parts, by aligning the groove 9 it can be ensured that, except the load limiting element 4, no further parts deform under the heavy loads while the high load limiting level is effective.

While the above description constitutes the preferred embodiment of the present invention, it will be appreciated that the invention is susceptible to modification, variation and change without departing from the proper scope and fair meaning of the accompanying claims.

The invention claimed is:

1. A seat belt retractor for a safety belt of a motor vehicle comprising:
    a belt shaft (1) rotatably mounted in a frame,
    a profile head (2) lockable in relation to the frame,
    a load limiting device (20) located between the profile head (2) and the belt shaft (1) for enabling the belt shaft (1) to undergo a load limited rotation during extraction of webbing of the safety belt in the extraction direction (A) with the profile head (2) being locked and a load limiting level predetermined by the load limiting device (20) being exceeded, wherein
    the load limiting device (20) is formed from at least a first and a second load limiting element (4, 5), by the activation of which the load limiting level can be switched from a lower level to a higher level during the load limited belt webbing extraction,
    a first load limiting element (4) providing the higher load limiting level, with the first load limiting element having a first end (4a) is connected to the profile head (2), and having a second end (4b),
    a second load limiting element (5) providing the lower load limiting level, which second load limiting element with a second end (5b) is connected to the belt shaft (1), and having a first end (5a),
    the second end (4b) of the first load limiting element (4) with the higher load limiting level is connected to the first end (5a) of the second load limiting element (5) with the lower load limiting level via a connecting element (6), and
    a coupling element (7) for coupling the connecting element (6) to the belt shaft (1), the connecting element (6) configured to move into a coupling position in which it is coupled to the belt shaft (1) after the belt shaft has undergone a rotation of at least a predetermined angle, the coupling element being formed by a spring element resiliently pre-loaded in the direction of the coupling position.

2. A seat belt retractor according to claim 1 further comprising in that at least one spring arm (7a, 7b) is located on the coupling element (7), which at least one spring arm rests on the belt shaft (1) and load the coupling element (7) in the direction of the coupling position.

3. A seat belt retractor according to claim 1 further comprising in that the coupling element (7) comprises a hooked portion (7c), and that the hooked portion (7c) is aligned in such a way that the rotational movement of the belt shaft (1) in the coupling position of the coupling element (7) can be transmitted onto the connecting element (6).

4. A seat belt retractor according to claim 1 further comprising that a groove (9) directed parallel to the axis of the belt shaft is provided in the connecting element (6), into which groove the coupling element (7) engages in the coupling position.

5. A seat belt retractor according to claim 1 further comprising in that the first and the second load limiting element (4, 5) each is formed by a torsion rod, and that the connecting element (6) connects the ends (5a, 4b) of the torsion rods facing each other to each other.

6. A seat belt retractor according to claim 1 further comprising in that the first and the second load limiting element (4, 5) are connected to each other to form a one-piece torsion rod comprising two load limiting portions, wherein the central portion is provided between the load limiting portions, via which central portion the torsion rod can be coupled to the belt shaft (1) via the coupling element (7).

7. A seat belt retractor according to claim 1 further comprising in that the connecting element (6) is tubular, and the first and second load limiting elements (4, 5) extend into the connecting element (6) through open sides of the connecting element, and that the connecting element (6) forms at least one radially inward-directed stiffening rib (13).

8. A seat belt retractor according to claim 1 further comprising in that the coupling element (7) is located on the belt shaft (1), and that the coupling element (7) together with the belt shaft (1) undergoes a relative movement in relation to the connecting element (6) during the load limited belt webbing extraction movement, the relative movement guiding the coupling element (7) to the coupling position.

9. A seat belt retractor according to claim 1 further comprising in that a recess (12) comprising a contact surface (12*a*) in the belt shaft (1) or in the connecting element (6), on which contact surface the coupling element (7) abuts prior to the coupling of the connecting element (6) to the belt shaft (1), and that the contact surface (12*a*) is formed in such a way that the coupling element (7) by abutting on the contact surface (12*a*) is forced to the coupling position when the belt shaft (1) undergoes a relative movement in relation to the connecting element (6).

* * * * *